US011416468B2

(12) United States Patent
Bo et al.

(10) Patent No.: US 11,416,468 B2
(45) Date of Patent: Aug. 16, 2022

(54) ACTIVE-ACTIVE SYSTEM INDEX MANAGEMENT

(71) Applicant: International Business Machines Corporation, Armonk, NY (US)

(72) Inventors: Xue Bo, Chang Ping District (CN); Xiaobo Wang, Haidian District (CN); Shuo Li, Beijing (CN); Sheng Yan Sun, Beijing (CN); He Fang Zhang, Beijing (CN); Yue Li, Chang Ping District (CN)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 16/934,059

(22) Filed: Jul. 21, 2020

(65) Prior Publication Data
US 2022/0027335 A1 Jan. 27, 2022

(51) Int. Cl.
*G06F 16/22* (2019.01)
*G06F 16/17* (2019.01)
*G06F 9/50* (2006.01)
*G06F 9/54* (2006.01)

(52) U.S. Cl.
CPC ........ *G06F 16/2282* (2019.01); *G06F 9/5016* (2013.01); *G06F 9/544* (2013.01); *G06F 16/1727* (2019.01); *G06F 16/1734* (2019.01); *G06F 16/2228* (2019.01); *G06F 2209/5011* (2013.01)

(58) Field of Classification Search
None
See application file for complete search history.

(56) References Cited

U.S. PATENT DOCUMENTS

| 7,222,079 | B1* | 5/2007 | Seare ..................... G16H 50/20 705/2 |
| 8,364,636 | B2 | 1/2013 | Newport |
| 8,996,458 | B2 | 3/2015 | Shang |
| 9,442,995 | B2 | 9/2016 | Pareek |
| 9,556,258 | B2* | 1/2017 | Nti-Gyabaah ....... C07K 16/065 |
| 10,364,268 | B2* | 7/2019 | Bill, Jr. ................ C07K 16/065 |

(Continued)

OTHER PUBLICATIONS

"A log merge method in active-active sites", An IP.com Prior Art Database Technical Disclosure, Authors et al.: Disclosed Anonymously, IP.com No. IPCOM000254082D, IP.com Electronic Publication Date: May 31, 2018, 6 Pages.

(Continued)

*Primary Examiner* — Kim T Nguyen
(74) *Attorney, Agent, or Firm* — Aaron N. Pontikos (57) ABSTRACT

A computer-implemented method for managing an index table associated with a data table includes obtaining an index entry associated with a key in the data table. The computer-implemented method further includes determining whether an index page associated with the index entry is in a buffer pool, wherein the buffer pool includes a plurality of index pages loaded from the index table and at least one temp index. The computer-implemented method further includes adding, in response to determining that the index page associated with the index entry is not in the buffer pool, the index entry into the at least one temp index. The computer-implemented method further includes consolidating the at least one temp index into the index table.

14 Claims, 7 Drawing Sheets

(56) References Cited

U.S. PATENT DOCUMENTS

| | | | | |
|---|---|---|---|---|
| 2003/0115240 | A1* | 6/2003 | Cho | G06Q 10/109 |
| | | | | 718/102 |
| 2009/0148435 | A1* | 6/2009 | Lebreton | A61P 9/14 |
| | | | | 530/416 |
| 2014/0187751 | A1* | 7/2014 | Nti-Gyabaah | C07K 1/36 |
| | | | | 530/387.3 |
| 2014/0348845 | A1* | 11/2014 | Bill, Jr. | C07K 1/18 |
| | | | | 530/413 |
| 2015/0056196 | A1* | 2/2015 | Lebreton | C07K 16/065 |
| | | | | 530/391.1 |
| 2015/0218620 | A1* | 8/2015 | Behlke | C12Q 1/6874 |
| | | | | 506/30 |
| 2016/0188197 | A1* | 6/2016 | Ryu | G06F 1/1692 |
| | | | | 345/156 |
| 2020/0102346 | A1* | 4/2020 | Bill, Jr. | C07K 1/18 |
| 2022/0027335 | A1* | 1/2022 | Bo | G06F 16/2228 |

OTHER PUBLICATIONS

"Synchronizing Mirror and Refresh to Optimize Replication Performance", An IP.com Prior Art Database Technical Disclosure, Authors et al.: Disclosed Anonymously, IP.com No. IPCOM000258008D, IP.com Electronic Publication Date: Mar. 30, 2019, 5 pages.

Well et al., "The NIST Definition of Cloud Computing", Recommendations of the National Institute of Standards and Technology, NIST Special Publication 800-145, Sep. 2011, 7 pages.

\* cited by examiner

ACTIVE-ACTIVE SYSTEM INDEX MANAGEMENT

BACKGROUND

The present invention relates to computer technology, and more specifically, to a computer-implemented method, computer system and computer program product for managing an index table associated with a data table.

Nowadays databases are widely used in many applications, such as for business or academic purposes to manage large amounts of data. Within a database, data may be stored in data tables. In some instances, the size of a data table may be of a predetermined size. In other instances, the size of a data table may be based on an amount of data to be arranged and stored in the table. Regardless, since the size of a data table can grow to be considerably large, data retrieval in the data table may consume a lot of computing resources if a whole table scan is performed.

SUMMARY

According to one embodiment of the present invention, a computer-implemented method for managing an index table associated with a data table is disclosed. The computer-implemented method includes obtaining an index entry associated with a key in the data table. The computer-implemented method further includes determining whether an index page associated with the index entry is in a buffer pool, wherein the buffer pool includes a plurality of index pages loaded from the index table and at least one temp index. The computer-implemented method further includes adding, in response to determining that the index page associated with the index entry is not in the buffer pool, the index entry into the at least one temp index. The computer-implemented method further includes consolidating the at least one temp index into the index table.

According to another embodiment of the present invention, a computer system for managing an index table associated with a data table is disclosed. The computer system includes one or more computer processors, one or more computer readable storage media, and program instructions stored on the computer readable storage media for execution by at least one of the one or more processors. The program instructions include instructions to obtain an index entry associated with a key in the data table. The program instructions further include instructions to determine whether an index page associated with the index entry is in a buffer pool, wherein the buffer pool includes a plurality of index pages loaded from the index table and at least one temp index. The program instructions further include instructions to add, in response to determining that the index page associated with the index entry is not in the buffer pool, the index entry into the at least one temp index. The program instructions further include instructions to consolidate the at least one temp index into the index table.

According to another embodiment of the present invention, a computer program product for managing an index table associated with a data table is disclosed. The computer program product includes one or more computer readable storage media and program instructions stored on the one or more computer readable storage media. The program instructions include instructions to obtain an index entry associated with a key in the data table. The program instructions further include instructions to determine whether an index page associated with the index entry is in a buffer pool, wherein the buffer pool includes a plurality of index pages loaded from the index table and at least one temp index. The program instructions further include instructions to add, in response to determining that the index page associated with the index entry is not in the buffer pool, the index entry into the at least one temp index. The program instructions further include instructions to consolidate the at least one temp index into the index table.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. The same reference numbers used throughout the drawings shall generally refer to the same components in the various embodiments of the present disclosure.

DETAILED DESCRIPTION

In accordance with various embodiments of the present invention, in order to facilitate data retrieval in a data table, one or more index tables may be created for one or more columns of the data table. For example, data (or values) in one column of the data table may be used as keys for creating an associated index table. The index table includes a plurality of index entries, each of which contains a key and a row ID (RID) indicating a row address of the key in the data table. The index entries in the index table are arranged in ascending order or descending order of their keys, such that searching for a target key in the index table will consume fewer computing resources than searching for the target key in the data table at random. After the target key is retrieved from the index table, an RID associated with the target key is utilized to find a corresponding row in the data table.

Embodiments of the present invention recognize that an improvement in index management can be made to various types of applications where a database is utilized. For example, in a log-based data replication scenario where a primary database and a standby database are both active, continuous availability of data can be provided for mission-critical businesses. However, if a large number of random keys need to be copied from the primary database to the standby database, the standby database may result in performance degradation, such as increased system latency due to current index management solutions.

During index management in accordance with embodiments of the present invention, data in one column of the data table may be used as keys for creating the index table, as described above. In this way, the index table is associated with the data table. If a key is inserted into the one column of the data table, an index entry including the key is required to be inserted into the index table. Similarly, if a key in the one column of the data table is deleted or updated, the index entry associated with the key is required to be deleted from or updated in the index table. To perform the action of inserting, deleting, or updating the index entry, an index page associated with the index entry may be loaded into a buffer pool. Each index page is a basic unit for assigning storage space for index entries. The index entries may be arranged in the respective index pages according to their keys, which means the associations between the index entries and the index pages may be determined based on their keys. After the index page associated with the index entry is loaded into the buffer pool, the index entry is inserted into, deleted from, or updated in the index page in the buffer pool.

When a large number of random keys are associated with various index pages, all of the index pages may not be able to reside in the buffer pool at the same time. In this scenario, index pages may be required to be frequently loaded into the buffer pool. However, embodiments of the present invention recognize that the frequent loading of index pages into the buffer pool can cause increased latency for operations performed between the primary database and standby database. This increased latency can result in the standby database becoming out of sync with the primary database, which ultimately can result in an inability to recover the most current versions of data from the standby database during disaster recovery.

Accordingly, embodiments of the present invention provide for an improved method for managing an index table that reduces latency for operations performed between a primary database and a standby database in an active-active configuration when a large number of random keys are associated with various index pages.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
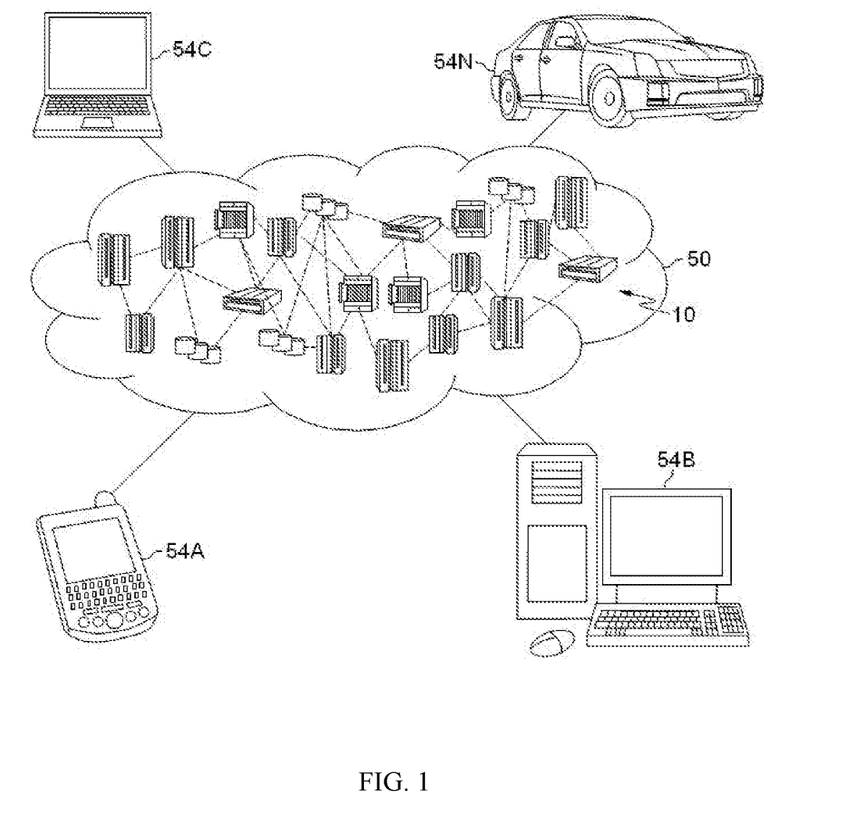
FIG. 1 depicts a cloud computing environment in accordance with at least one embodiment of the present invention.

Referring now to FIG. 1, a cloud computing environment in accordance with at least one embodiment of the present invention is depicted. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
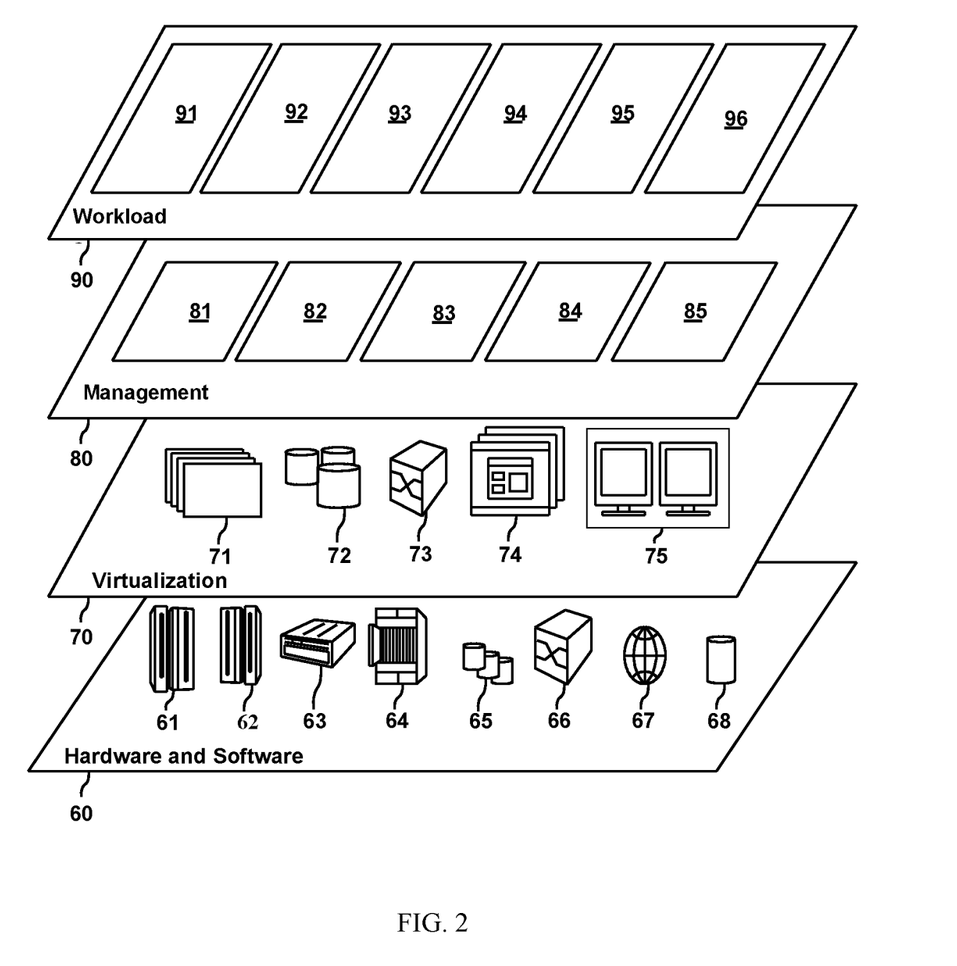
FIG. 2 depicts abstraction model layers in accordance with at least one embodiment of the present invention.

Referring now to FIG. 2, a set of functional abstraction layers provided by cloud computing environment 50 (shown in FIG. 1) is depicted. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and index management 96.

Figure 3:
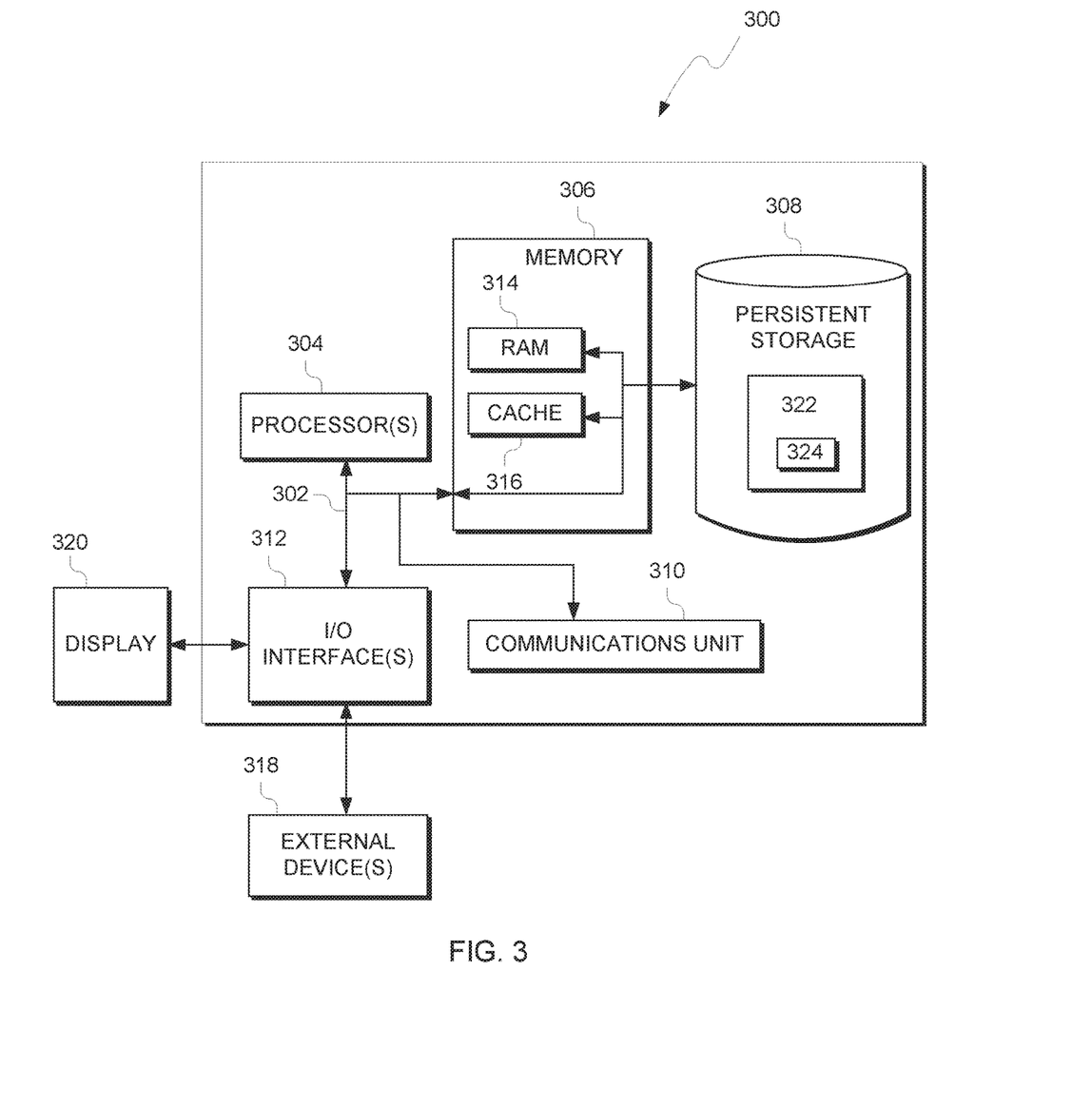
FIG. 3 depicts a cloud computing node in accordance with at least one embodiment of the present invention.

Referring now to FIG. 3, a computing device 300 of cloud computing node 10 (depicted in FIG. 1) in accordance with at least one embodiment of present invention is disclosed. It should be appreciated that FIG. 3 provides only an illustration of one implementation and does not imply any limitations with regard to the environments in which different embodiments may be implemented. Many modifications to the depicted environment may be made.

As depicted in FIG. 3, computing device 300 of cloud computing node 10 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Program/utility 322, having one or more program modules 324 are stored in persistent storage 308 for execution and/or access by one or more of the respective computer processors 304 via one or more memories of memory 306. Program modules 324 generally carry out the functions and/or methodologies of embodiments of the present invention as described herein. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of cloud computing environment 50. In these examples, communications unit 310 includes one or more network interface cards. Communications unit 310 may provide communications through the use of either or both physical and wireless communications links. Program modules 324 may be downloaded to persistent storage 308 through communications unit 310.

I/O interface(s) 312 allows for input and output of data with other devices that may be connected to computing device 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., program modules 324, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 4:
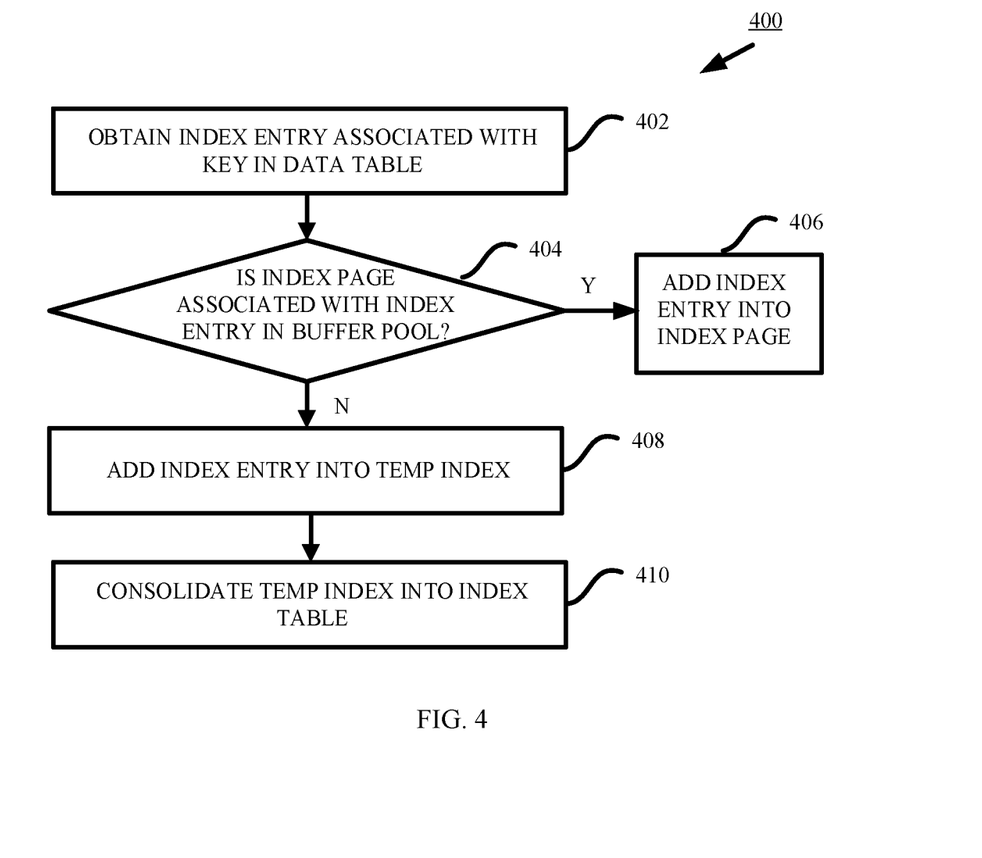
FIG. 4 depicts a schematic flowchart of a method for managing an index table associated with a data table in accordance with at least one embodiment of the present invention.

Referring now to FIG. 4, a schematic flowchart of a method 400 for managing an index table associated with a data table in accordance with at least one embodiment of the present invention is depicted. At step 402, an index entry associated with a key in the data table is obtained. The index entry may include the key, an RID indicating a row address of the key in the data table, and a flag indicating availability of the index entry. The index entry may be obtained in response to, but not limited to, one or more of the following: a key being inserted into the data table at a row address; the key at a row address being deleted from the data table; and a key replacing a current key at a row address in the data table.

Figure 5:
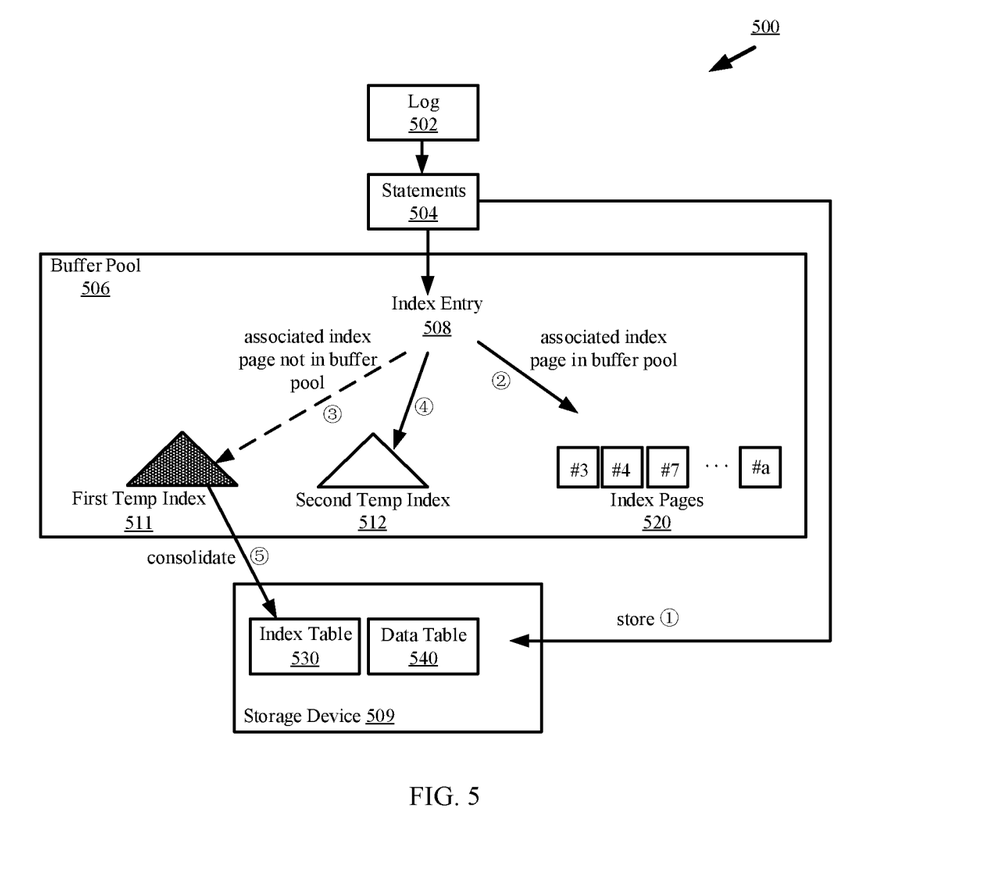
FIG. 5 depicts an example of a standby database in a log-based data replication scenario in accordance with at least one embodiment of the present invention.

In a log-based replication scenario, the index entry may be obtained by executing one of a plurality of statements in a received log by a standby database. Referring now to FIG. 5, an example of a standby database 500 in a log-based data replication scenario in accordance with at least one embodiment of the present invention is disclosed. As depicted in FIG. 5, a log 502 may be received by a standby database 500. For example, log 502 is sent from a primary database (not depicted) to standby database 500. Then, a plurality of statements 504 may be read or parsed from log 502. Prior to executing any of the plurality of statements 504 to obtain an index entry, the plurality of statements 504 may be stored (as shown by arrow ①) in a storage device 509 of standby database 500 for backup. In case of system outage, the stored plurality of statements 504 may be used for system recovery.

Returning back to FIG. 4, at step 404, a determination is made as to whether an index page associated with the index entry is in a buffer pool. Referring now to FIG. 5, a buffer pool 506 may include a plurality of index pages 520 loaded from an index table 530 in storage device 509. Index table 530 may be associated with the data table 540 in storage device 509. In an embodiment, the number of index pages 520 that can be loaded is predefined, for example, based on a storage capacity of the buffer pool 506. Buffer pool 506 may further include at least one temporary index (hereinafter referred to as a temp index), in which each temp index may be in the form of a B-tree or a B+ tree. In the exemplary standby database of FIG. 5, only a first temp index 511 and a second temp index 512 are shown. However, it should be appreciated that a single temp index (e.g., first temp index 511) or multiple temp indexes may be used in accordance with various embodiments of the present invention. In an embodiment, temp indexes may be created for index entries whose associated index pages have low hit ratios and/or short residency times since such index pages may need to be loaded into the buffer pool more frequently.

Returning back to FIG. 4, if a determination is made that the index page associated with the index entry is in the buffer pool (decision step 404 "Y" branch), then the index entry is added into its associated index page at step 406. For example, if it is determined that index page 520 associated with index entry 508 is in buffer pool 506 (as shown by arrow ② in FIG. 5), then index entry 508 may be added into its associated index page 520.

However, if it is determined that the index page associated with the index entry is not in the buffer pool (decision step 404 "N" branch), then the index entry is added into at least one temp index at step 408. For example, if index page 520 associated with index entry 508 is not in buffer pool 506 (as shown by dotted arrow ③ in FIG. 5), then index entry 508 may be added into first temp index 511 if an available storage capacity of first temp index 511 is above a predetermined threshold. However, if an available storage capacity of first temp index 511 is below a predetermined threshold, then index entry 508 may be added (as shown by arrow ④ in FIG. 5) into second temp index 512.

As mentioned above, the index entry may be obtained in response to a replacement key or new key replacing a current key at a row address in the data table, which means the current key at the row address in the data table may be required to be updated. In this case, in the process of adding the index entry into the at least one temp index, the index entry may be divided into a first index entry and a second index entry. The first index entry may include the current key, the RID, and a first flag indicating the first index entry being unavailable or invalid. Similarly, the second index entry may include the replacement or new key, the RID, and a second flag indicating the second index entry being available or valid. In this scenario, the first index entry is added into a temp index before the second index entry is added into the same temp index.

In an embodiment, at least one temp index may be designated to only store index entries to be deleted from the index table and at least one other temp index may be designated to only store index entries to be added into the index table. For example, a first specific temp index may include an indicator indicating index entries are to be added to the index table. In this case, if the index entry is obtained in response to the key being inserted into the data table at the row address, the index entry may be added into the first specific temp index. Similarly, a second specific temp index may include an indicator indicating index entries therein that are to be deleted from the index table. In this case, if the index entry is obtained in response to the key at the row address being deleted from the data table, the index entry may be added into the second specific temp index.

In an embodiment, a first portion of a temp index may be designated to only store index entries to be deleted from the index table and a second portion of the temp index may be designated to only store index entries to be added into the index table. For example, a first portion of a specific temp index may include an indicator indicating index entries are to be added to the index table. In this case, if the index entry is obtained in response to the key being inserted into the data table at the row address, the index entry may be added into the first portion of the specific temp index. Similarly, a second portion of the specific temp index may include an indicator indicating index entries therein that are to be deleted from the index table. In this case, if the index entry is obtained in response to the key at the row address being deleted from the data table, the index entry may be added into the second portion of the specific temp index.

In an embodiment, if the index entry being obtained is in response to a new or replacement key replacing a current key at the row address in the data table, the index entry may be divided into a first index entry and a second index entry. The first index entry may include the current key, the RID, and a first flag indicating the first index entry being unavailable or invalid. The second index entry may include the new or replacement key, the RID, and a second flag indicating the second index entry being available or valid. In an embodiment, the first index entry may be added into the first specific temp index and the second index entry may be added into the second specific temp index.

Returning to FIG. 4, at step 410, the at least one temp index is consolidated with the index table. For example, first temp index 511 is consolidated with index table 530 (as shown by arrow ⑤ in FIG. 5) if first temp index 511 reaches and/or exceeds a predetermined available storage capacity threshold. Here, second temp index 512 may be used to accommodate subsequent index entries during consolidation of first temp index 511 with index table 530. After consolidation, whereby index entries included in first temp index 511 are transferred to the index table (e.g., index table 530), index entries are deleted (e.g., index entries are deleted from first temp index 511) to thereby free up storage space on first temp index 511. Similarly, if second temp index 512 reaches and/or exceeds a predetermined available storage capacity threshold, second temp index 512 may be consolidated with index table 530, and first temp index 511 may be used for accommodating subsequent index entries during consolidation of second temp index 512 with index table 530.

From the above, if an index page associated with an index entry is not in the buffer pool, the method 400 may temporarily keep the obtained index entries in at least one temp index, and consolidate at least one temp index (containing the index entries included in index pages not in the buffer pool) into the index table at a later point in time. In this way, when any index entry is obtained, its associated index page may not need to be loaded into the buffer pool immediately. Therefore, the frequency of loading index pages into the buffer pool may be reduced, thus avoiding increased latency when performing operations between a primary database and a standby database.

Although only first temp index 511 and second temp index 512 are depicted in FIG. 5, fewer than or more than two temp indexes may be used. In the case of more than two temp indexes being employed, the keys in the temp indexes may be random, and the key ranges of two or more temp indexes may partially overlap.

Figure 6:
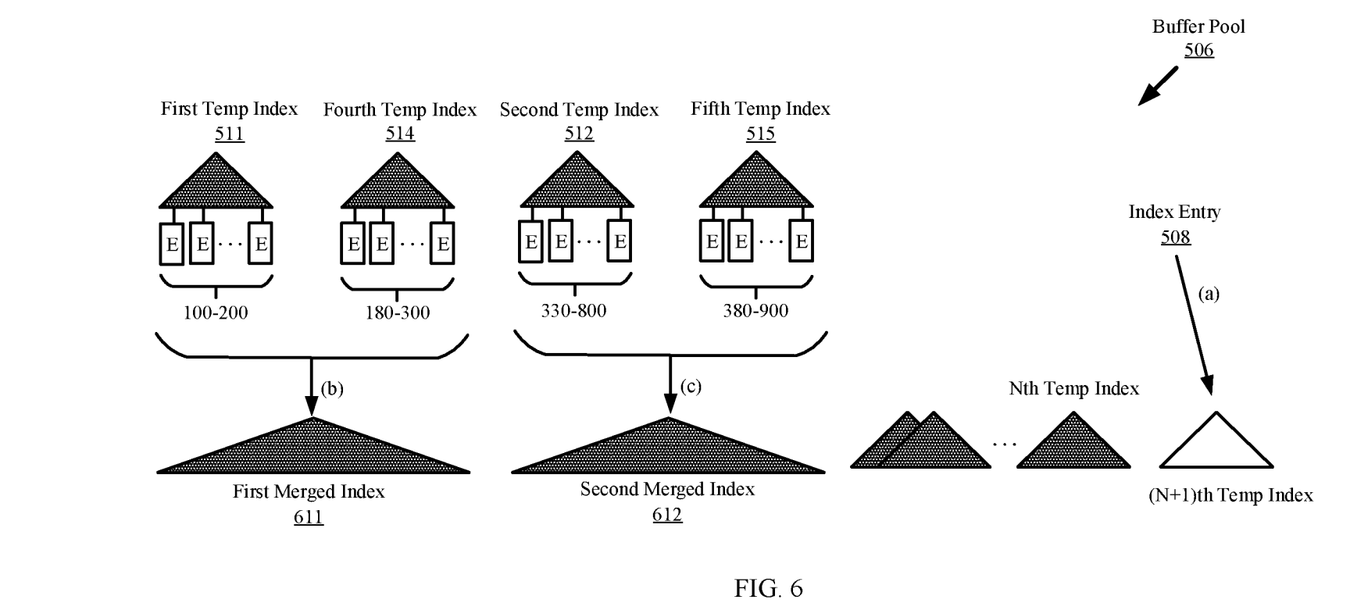
FIG. 6 depicts an exemplary buffer pool of the standby database of FIG. 5 in accordance with at least one embodiment of the present invention.

Referring now to FIG. 6, an exemplary buffer pool of standby database 500 of FIG. 5 in accordance with at least one embodiment of the present invention is depicted. More particularly, FIG. 6 illustrates a scenario where a plurality of temp indexes (N) having key ranges between the plurality of temp indexes partially overlap. In an embodiment, if a predetermined number of temp indexes of the plurality of temp indexes (N) have an available storage capacity below a predetermined threshold, it may be determined whether the key ranges of at least two temp indexes of the plurality of temp indexes (N) are at least partially overlapped. If it is determined that at least two temp indexes have key ranges that at least partially overlap, the at least two temp indexes may be merged to form a merged index.

Referring specifically to FIG. 6, the first to the $N^{th}$ temp indexes may be full of index entries (denoted by "E"), and thus index entry 508 may be added into the $(N+1)^{th}$ temp index as shown by arrow(a). The key range of the first temp index 511 may be from 100 to 200. The key range of the second temp index 512 may be from 330 to 800. The key range of the fourth temp index 514 may be from 180 to 300. The key range of the fifth temp index 515 may be from 380 to 900. In this case, the key ranges of the first temp index 511 and the fourth temp index 514 are partially overlapping, and the key ranges of the second temp index 512 and the fifth temp index 515 are partially overlapping. Accordingly, first temp index 511 and fourth temp index 514 may be merged to form a first merged index 611 (as shown by arrow(b)). Similarly, second temp index 512 and fifth temp index 515 may be merged to form a second merged index 612 (as shown by arrow(c)).

The merged indexes 611 and 612 may be consolidated into index table 530 (depicted in FIG. 5) asynchronously and/or in parallel. After consolidation, whereby index entries included in merged index 611 and merged index 612 are transferred to the index table (e.g., index table 530), the merged indexes are dropped or otherwise deleted. As to the unmerged temp indexes of the N temp indexes, they may be similarly consolidated with the index table 530 asynchronously and/or in parallel with respect to the merged indexes. After consolidation, whereby index entries included in the unmerged temp indexes are transferred to the index table (e.g., index table 530), index entries are deleted to thereby free up storage space on the unmerged temp indexes.

It should be appreciated that since two or more temp indexes may be merged into a bigger merged index, the same index pages associated with the two or more temp indexes may not need to be loaded into the buffer pool multiple times. In this way, the frequency of loading index pages into the buffer pool may be further reduced.

Figure 7:
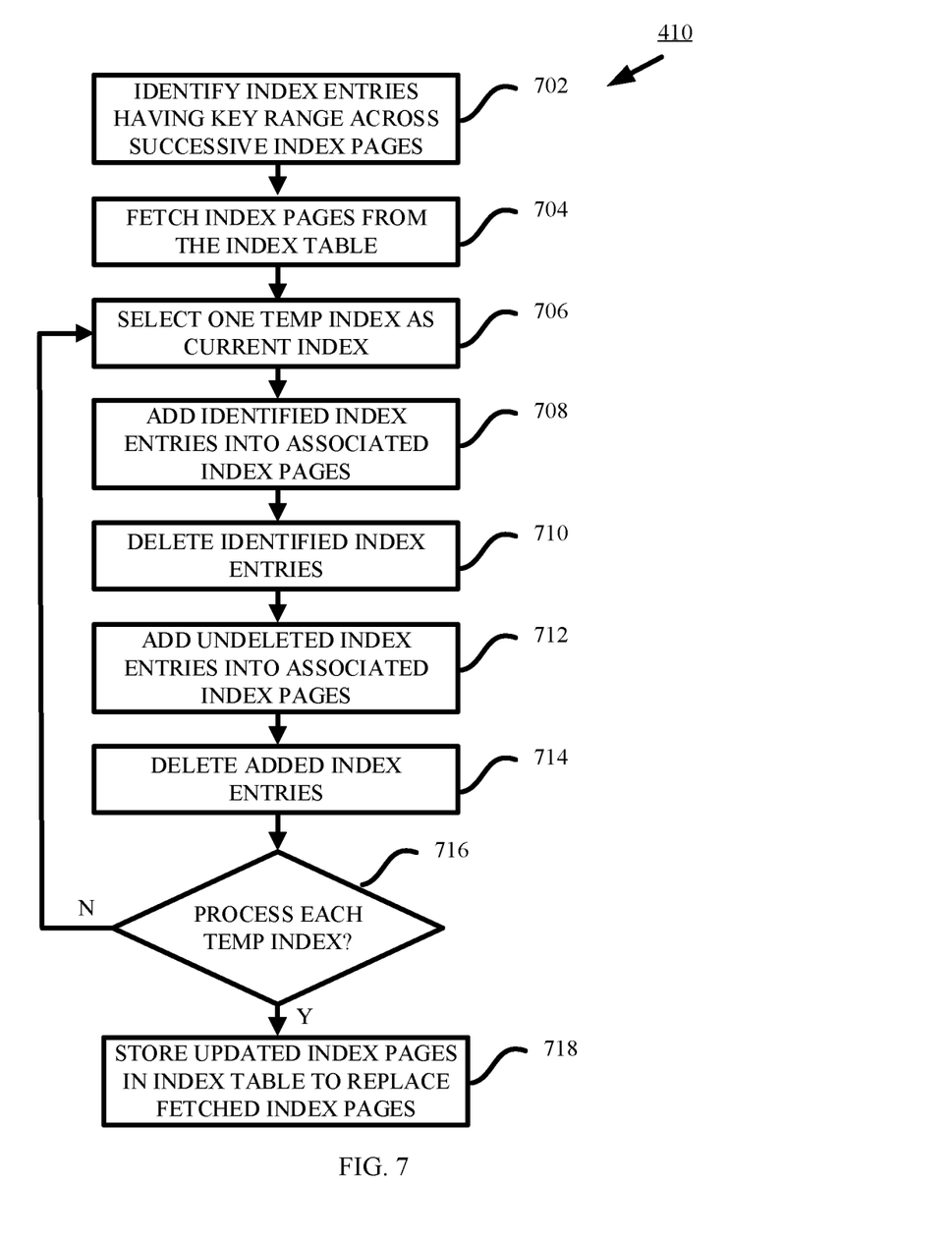
FIG. 7 depicts a schematic flowchart of a method for consolidating the at least one temp index into the index table of FIG. 4 in accordance with at least one embodiment of the present invention.

FIG. 7 depicts a schematic flowchart of a method for consolidating at least one temp index into the index table of FIG. 4 in accordance with at least one embodiment of the present invention. More particularly, FIG. 7 illustrates an exemplary consolidation process of step 410 of FIG. 4 in which at least one temp index is consolidated with an index table.

At step 702, the index entries in each temp index having a key range across at least two successive index pages are identified. For example, second temp index 512 (shown in FIG. 5) may actually have a key range from 330 to 480 and 710 to 800. In this example, index page #3 of index table 530 (shown in FIG. 5) may have a key range from 301 to 400. Similarly, index page #4 of index table 530 (shown in FIG. 5) may have a key range from 401 to 500. Likewise, index page #7 of index table 530 (shown in FIG. 5) may have a key range from 701 to 800. Therefore, the key range from 330 to 480 may be partially overlapping between two successive index pages, index page #3 and index page #4. The index entries having the key range from 330 to 480 may be identified. In this way, the index entries in the respective temp indexes having the key range across at least two successive index pages may be identified in this step.

At step 704, one or more index pages associated with the index entries in each temp index are fetched from the index table. In the above example, index page #3, index page #4, and index page #7 may be fetched from index table 530 (shown in FIG. 5). However, if there are many successive index pages (e.g., a number of successive index pages above a predetermined threshold or a number of successive index pages that exceeds an amount of available free storage space in the buffer pool), then index pages associated with the identified index entries may be fetched from the index table 530 in accordance with a priority level associated with the index pages. For example, index pages having a higher priority level are fetched prior to index pages having a lower priority level.

At step 706, one by one, each temp index may be selected as a current index to be processed. In an embodiment, multiple temp indexes may also be selected and processed simultaneously.

At step 708, the identified index entries in the current index (i.e., the current selected temp index) may be added into their associated index pages of the fetched index pages, and thus the fetched index pages may be updated accordingly. Since the time cost of adding index entries into successive index pages may be shorter than that of adding these index entries into nonconsecutive index pages, the time of the consolidating action at step 410 may be reduced.

At step 710, the identified index entries may be deleted from the current index.

At step 712, the undeleted index entries in the current index are added into their associated index pages of the fetched index pages, and thus the fetched index pages may be updated accordingly. At step 714, the added index entries are deleted from the current index.

At step 716, it is determined whether each temp index is processed. If every temp index has not been processed (decision step 716 "N branch), the process returns to step 706 to process a next temp index.

If every temp index has been processed (decision step 716 "Y" branch), then the process proceeds to step 718 to merge the updated index pages with the index table. Here, the updated index pages may replace the fetched index pages in the index table.

One of ordinary skill in the art will appreciate that the process 410 may also be applied to the merged indexes as previously described with reference to FIG. 6, in which a merged index may be considered as a larger temp index.

It should be noted that the method 400 can support query functions. If a select statement including a target key is received, the temp index that is consolidated or merged with the index table may be locked, which means consolidation or merging is paused. At this point, the index entry having the target key is searched within the available index entries in a temp index to find its corresponding RID. Next, the index entry having the target key is searched in the available index entries in the index table to find its corresponding RID. Here, the available index entry may refer to one whose flag indicates the index entry is available.

What is claimed is:

1. A computer-implemented method for managing an index table associated with a data table, the method comprising:
    obtaining, in response to a current key in the data table being replaced with a new key, a current index entry associated with the current key from an index page of the index table;
    determining whether the index page associated with the current index entry is loaded in a buffer pool;
    adding, in response to determining that the index page associated with the current index entry is not loaded in the buffer pool, a new index entry associated with the new key into at least one temporary index stored in the buffer pool; and
    consolidating, in response to the at least one temporary index having an available storage capacity below a predetermined threshold, the at least one temporary index including the new index entry with the index page of the index table.

2. The computer-implemented method of claim 1, wherein the at least one temporary index includes a first temporary index and a second temporary index, and wherein:
    the new index entry is added into the second temporary index and the first temporary index is consolidated with the index table in response to the first temporary index having an available storage capacity below a predetermined threshold.

3. The computer-implemented method of claim 1, wherein the at least one temporary index includes a first temporary index and a second temporary index, and wherein consolidating the at least one temporary index with the index table comprises, in response to each of the first and second temporary indexes having an available storage capacity below a predetermined threshold:
    merging, in response to key ranges of the first and second temporary indexes being at least partially overlapping, the the first and second temporary indexes into a merged index;
    consolidating index pages included in the merged index with the index table; and
    deleting, in response to consolidating the index pages included in the merged index with the index table, the merged indexes.

4. The computer-implemented method of claim 1, wherein consolidating the at least one temporary index with the index table further comprises:
    identifying index entries in the at least one temporary index having a key range across at least two successive index pages;
    fetching from the index table one or more index pages associated with the index entries in the at least one temporary index, wherein the one or more index pages includes the index pages associated with the identified index entries;
    adding the identified index entries in the at least one temporary index into their associated index pages of the fetched index pages to update the fetched index pages;
    deleting the identified index entries from the at least one temporary index;
    adding any unidentified index entries in the at least one temporary index into their associated index pages of the fetched index pages to update the fetched index pages;
    deleting the added unidentified index entries from the at least one temporary index; and
    storing the updated index pages in the index table to replace the fetched index pages.

5. The computer-implemented method of claim 1, further comprising:
    adding, in response to determining that the index page associated with the current index entry is not loaded in the buffer pool, the new index entry associated with the new key into a first temporary index stored in the buffer pool, and the current index entry associated with the current key into a second temporary index stored in the buffer pool.

6. The computer-implemented method of claim 1, further comprising:
  obtaining the index entry based, at least in part, on executing one of a plurality of statements in a received log;
  reading the plurality of statements from the received log; and
  storing the plurality of statements.

7. The computer-implemented method of claim 1, further comprising:
  creating the one or more temporary indexes.

8. A computer system for managing an index table associated with a data table, the computer system comprising:
  one or more computer processors,
  one or more computer readable storage media, and
  program instructions stored on the computer readable storage media for execution by at least one of the one or more processors, the program instructions including instructions to:
    obtain, in response to a current key in the data table being replaced with a new key, a current index entry associated with the current key from an index page of the index table;
    determine whether the index page associated with the current index entry is loaded in a buffer pool;
    add, in response to determining that the index page associated with the current index entry is not loaded in the buffer pool, a new index entry associated with the new key into at least one temporary index stored in the buffer pool; and
    consolidate, in response to the at least one temporary index having an available storage capacity below a predetermined threshold, the at least one temporary index including the new index entry with the index page of the index table.

9. The computer system of claim 8, wherein the at least one temporary index includes a first temporary index and a second temporary index, and wherein:
  the new index entry is added into the second temporary index and the first temporary index is consolidated with the index table in response to the first temporary index having an available storage capacity below a predetermined threshold.

10. The computer system of claim 8, the at least one temporary index includes a first temporary index and a second temporary index, and wherein the program instructions to consolidate the at least one temporary index with the index table comprises, in response to each of the first and second temporary indexes having an available storage capacity below a predetermined threshold, instructions to:
  merge, in response to key ranges of the first and second temporary indexes being at least partially overlapping, the the first and second temporary indexes into a merged index;
  consolidate index pages included in the merged index with the index table; and
  delete, in response to consolidating the index pages included in the merged index with the index table, the merged indexes.

11. The computer system of claim 8, wherein consolidating the at least one temporary index with the index table further comprises:
  identify index entries in the at least one temporary index having a key range across at least two successive index pages;
  fetch from the index table one or more index pages associated with the index entries in the at least one temporary index, wherein the one or more index pages includes the index pages associated with the identified index entries;
  add the identified index entries in the at least one temporary index into their associated index pages of the fetched index pages to update the fetched index pages;
  delete the identified index entries from the at least one temporary index;
  add any unidentified index entries in the at least one temporary index into their associated index pages of the fetched index pages to update the fetched index pages;
  delete the added unidentified index entries from the at least one temporary index; and
  store the updated index pages in the index table to replace the fetched index pages.

12. The computer system of claim 8, further comprising program instructions to:
  add, in response to determining that the index page associated with the current index entry is not loaded in the buffer pool, the new index entry associated with the new key into a first temporary index stored in the buffer pool, and the current index entry associated with the current key into a second temporary index stored in the buffer pool.

13. The computer system of claim 8, wherein the program instructions further include instructions to:
  create the one or more temporary indexes.

14. A computer program product for managing an index table associated with a data table, the computer program product including one or more computer readable storage media and program instructions stored on the one or more computer readable storage media, the program instructions including instructions to:
  obtain, in response to a current key in the data table being replaced with a new key, a current index entry associated with the current key from an index page of the index table;
  determine whether the index page associated with the current index entry is loaded in a buffer pool;
  add, in response to determining that the index page associated with the current index entry is not loaded in the buffer pool, a new index entry associated with the new key into at least one temporary index stored in the buffer pool; and
  consolidate, in response to the at least one temporary index having an available storage capacity below a predetermined threshold, the at least one temporary index including the new index entry with the index page of the index table.

* * * * *